April 14, 1964 W. R. MOULTON 3,128,512
RELEASE MECHANISM
Filed May 10, 1961

INVENTOR
William R. Moulton
BY
ATTORNEYS

United States Patent Office 3,128,512
Patented Apr. 14, 1964

3,128,512
RELEASE MECHANISM
William R. Moulton, Pierson, Fla., assignor to Merritt-Chapman & Scott Corporation, a corporation of Delaware
Filed May 10, 1961, Ser. No. 109,100
2 Claims. (Cl. 24—270)

This invention relates to a release mechanism and more particularly to a positive release mechanism which may be remotely controlled and operated.

It is desirable in many instances to have a release mechanism which will comprise a minimum of parts, which will never jam and will act positively to release a load, and which may be operated remotely. Such a release mechanism is particularly adaptable for use when laying underwater pipelines where a pipeline is partially supported by submerged pontoons and where the pontoons may be released from the pipeline from the surface of the water. Previous release mechanisms used for releasing buoyant pontoons were connected to the underwater pipe by load carrying straps and required use of a cutting means to cut through the straps. The cutters were actuated by electrical and mechanical means which, because they were under water, sometimes failed, and which in any event were relatively complicated, expensive structures.

I propose to provide for a simplified, positive release means which may be remotely controlled and which is provided with a minimum of moving parts. Broadly, my release mechanism comprises two vertically extending plates mounted on a body member. A disc is rotatably mounted on each plate with both discs coaxial with a common horizontal axis and a common handle means is connected to the discs for rotating them. Each of the discs has a notch cut in its outer periphery into which a single pin is positioned. A load carrying strap is connected to the pin so that, when the pin is opposite to the axis of rotation of the discs from the direction of force applied by the load carrying strap, the pin will be positively held in the notches by the force of the strap. When the discs are rotated towards the direction of the force of the load carrying strap, the pin will be pulled out of the notches in the discs so releasing the pin and load carrying strap from the release mechanism.

The release mechanism further may have a stationary pin connected to and extending between the two upstanding plates to which the other end of the load carrying strap may be connected.

Referring to the drawings in which a preferred embodiment of my invention is illustrated.

Figure 1:
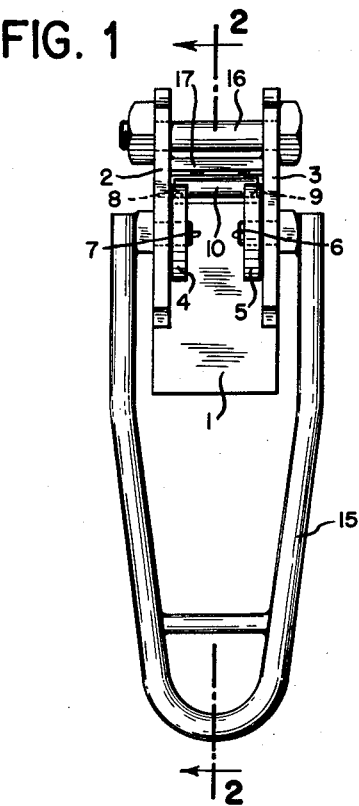
FIG. 1 is a front view of a release mechanism constructed according to my invention.

Referring to the drawings in greater detail and in particular to FIG. 1, 1 denotes a body member on which are mounted two vertically extending plates 2 and 3. Discs 4 and 5 are rotatably mounted on plates 2 and 3 by means of shafts 6 and 7 which are coaxial. Notches 8 and 9 are cut in the outer periphery of the discs in order to receive a releasable pin 10.

Releasable pin 10 in turn is connected to the end of a load carrying strap 11. Load carrying strap 11 is, as shown in the drawings, an iron strap which has a loop 12 on its releasable end held by rivets 13. It is to be understood that any sort of a strap may be used.

A handle 15 is mounted on shafts 6 and 7 so that by moving the handle, the shafts and discs may be caused to rotate. Preferably, the release mechanism has a stationary pin 16 on which the other end of strap 11 is connected. A protective cover 17 prevents inadvertent disengagement of the pin 10 from the notches 8 and 9.

Figure 3:
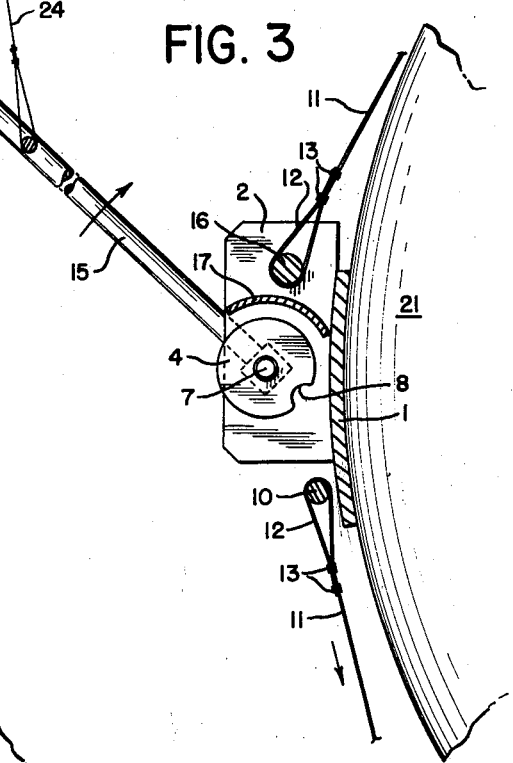
FIG. 3 is a view similar to FIG. 2 showing the release mechanism in the unlocked position; and, FIG. 4 is a sectional view illustrating a use of the release mechanism in attaching buoyant tanks to underwater pipelines whereby the mechanism may be remotely unlocked.
Figure 2:
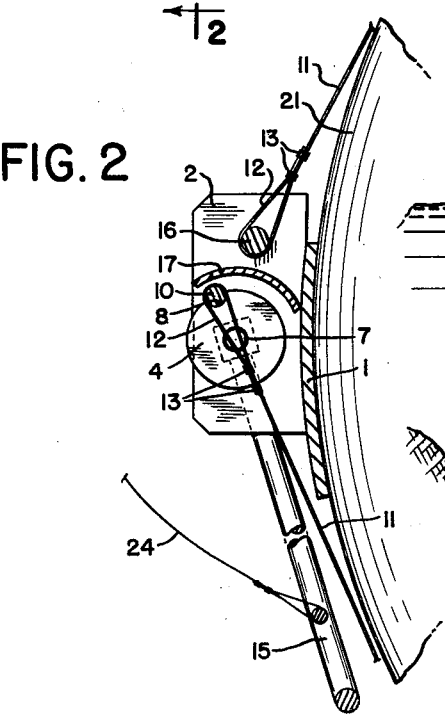
FIG. 2 is a side sectional view of FIG. 1 taken along lines 2—2 and showing the release mechanism in a locked position applied to a buoyant tank.

With the pin shown in a position illustrated in FIGS. 1 and 2, it is seen that when a load is applied by strap 11 to the pin so that the pin will be pulled downwards into the notches 8 and 9, the release mechanism will be in the locked position. As the handle 13 is rotated, as shown in FIG. 3, the pin 10 will fall out of the notches 8 and 9 so releasing the load carrying strap 11 from the release mechanism.

Figure 4:
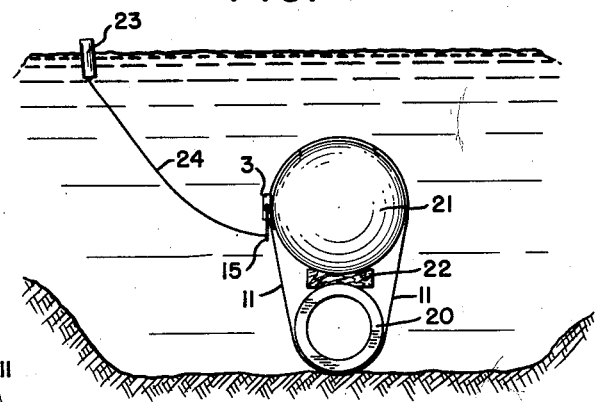

Reference is made to FIG. 4 which shows a particular application of the release mechanism. Here an underwater pipeline 20 is partially buoyed by pontoons 21 while under water. A wood block 22 serves to protect the protective covering on line 20 from rubbing with the pontoons 21. The load carrying strap 11 is connected to pins 10 and 16 as illustrated in FIGS. 2 and 3. A buoy or remote control station 23 which floats on the surface is connected by a line or control means 24 to the handle 15. When it is decided to release the pontoons 21 from the line 20, the line 24 is pulled which in turn will rotate the handle 15 to allow pin 10 to fall. Pontoon 21 will then float to the surface while the buoy 23 which is still connected to the handle 15 by line 24 will support the release mechanism so that the mechanism may be recovered.

It is seen that my release mechanism can be unlocked remotely and that the unlocking will be positive. Because of its construction, it is inexpensive to make and any chance of its malfunctioning is minimized. While I show the mechanism as being used to lock pontoons to underwater pipelines, it is obvious that the mechanism has other uses. For example, the mechanism could be used on davits to support lifeboats to provide a positive, simple, and quick acting release of the lifeboat from the davits.

It is not necessary that the nonreleasable end of the load carrying strap be carried on release mechanisms but could be connected to another stationary member.

Other modifications of the invention are possible and the invention is to be limited only by the scope of the appended claims.

I claim:

1. A remote control positive release means for releasably connecting a pontoon to a section of pipe comprising, a body member adapted to be brought against a side of a pontoon, two spaced vertically extending plate members affixed to said body member, two rotatable discs, with a disc being mounted on each said plate member along a single horizontally extending axis, there being a notch on the periphery of each said disc with said notch being above said axis when a pontoon is connected to a section of pipe, a load carrying strap affixed at one end to said plate members above said discs adapted to extend over a pontoon and under a section of pipe, a releasable pin member affixed to the other end of said load carrying strap and positioned in said notches when a pontoon is connected to a section of pipe, a handle for rotating said discs, and control means extending from said handle to a remote control station whereby when said control means is actuated, said handle is caused to move to rotate said discs and allow said releasable pin to be pulled from said notches under the force of said load carrying strap.

2. A remote control positive release means according to claim 1 having in addition a protective cover fixed to said body member and spaced above and extending around a portion of said discs to prevent said releasable pin from being pulled from said notches before rotation of said discs.

References Cited in the file of this patent
UNITED STATES PATENTS

| | | |
|---|---|---|
| 603,674 | Arkell | May 10, 1898 |
| 702,322 | McCord | June 10, 1902 |
| 794,782 | Forbes | Jan. 19, 1904 |
| 2,770,950 | Collins | Nov. 20, 1956 |
| 2,940,148 | Gentile | June 14, 1960 |